United States Patent
Charewicz

[19]

[11] Patent Number: 6,039,517
[45] Date of Patent: Mar. 21, 2000

[54] INTERNALLY COOLED MAGNETIC WORKPIECE HOLDER

[76] Inventor: Daniel Joseph Charewicz, 9712 McConnell Rd., Woodstock, Ill. 60098

[21] Appl. No.: 08/941,817

[22] Filed: Sep. 30, 1997

[51] Int. Cl.$^7$ .............................. B23Q 3/06; B23B 31/28
[52] U.S. Cl. .............................. 409/135; 269/8; 279/128; 409/225
[58] Field of Search ................................ 279/128; 269/8; 408/76; 409/135, 136, 219, 225; 451/364, 449, 488

[56] References Cited

U.S. PATENT DOCUMENTS

| | | | |
|---|---|---|---|
| 3,834,088 | 9/1974 | Matson | 51/267 |
| 3,835,428 | 9/1974 | Ito | 335/288 |
| 3,978,625 | 9/1976 | Klaassen | 51/267 |
| 4,023,267 | 5/1977 | Pignataro | 279/128 |
| 4,164,879 | 8/1979 | Martin | 82/2 R |
| 4,166,990 | 9/1979 | Kassner | 29/606 X |
| 4,272,216 | 6/1981 | Osburn | 409/219 |
| 4,442,576 | 4/1984 | Kitamura | 29/39 |
| 4,575,702 | 3/1986 | Nitta et al. | 335/286 |
| 4,657,068 | 4/1987 | Peltz | 451/449 |
| 4,664,565 | 5/1987 | Palm | 408/6 |
| 4,811,525 | 3/1989 | Kimura et al. | 51/166 MH |
| 5,080,380 | 1/1992 | Nakagawa et al. | 279/128 |
| 5,266,914 | 11/1993 | Dickson et al. | 335/288 |
| 5,338,045 | 8/1994 | Yang | 279/128 |
| 5,535,090 | 7/1996 | Sherman | 279/128 |
| 5,595,462 | 1/1997 | Hensley | 409/132 |
| 5,613,812 | 3/1997 | Levan et al. | 409/136 |
| 5,664,916 | 9/1997 | Link et al. | 409/135 |
| 5,669,743 | 9/1997 | Johnson et al. | 409/135 |

OTHER PUBLICATIONS

Three pages of KANETEC catalog showing and describing Models KC and KCT–U water–cooling electromagnetic chucks.

*Primary Examiner*—William Briggs
*Attorney, Agent, or Firm*—Jon Carl Gealow

[57] ABSTRACT

A cooled magnetic chuck or cooled magnetic adapter for use with a magnetic chuck. Coolant passages are formed in a magnetic chuck, or in a cooled magnetic adapter for transmitting the magnetic forces of a magnetic chuck to a work piece, such that the heat generated in the workpiece by engagement with a material removing tool may be conducted away from the workpiece. The coolant passages are arranged such that a coolant fluid engages the magnetic materials of the magnetic chuck or adapter, portions of which magnetic material also engage the workpiece.

42 Claims, 12 Drawing Sheets

INTERNALLY COOLED MAGNETIC WORKPIECE HOLDER

BACKGROUND OF THE INVENTION

1. Field of the Invention

In order to perform machining operations on a piece of steel, it is necessary to hold the piece of steel while it is being engaged by the machining tool, be it a grinding wheel, drill bit, or any other type of cutting tool. One commonly used arrangement for holding a steel workpiece which is being shaped by a material removal operation utilizes a magnetic force applied to the workpiece. In the machine tool industry such a magnetic holding device is typically referred to as a magnetic chuck. The magnetic chuck includes a source of magnetism or magnetic fields, which applies an attractive magnetic force to a magnetic steel workpiece piece. Typically, the magnetic chuck has a flat planar surface to which the workpiece is attracted by the magnetic force. The magnetic force of the chuck may be provided by either permanent magnets or electromagnets. The magnetic chuck further includes a control arrangement whereby the magnetic force applied to a magnetic steel workpiece placed on the flat planar surface may be activated or discontinued.

The machining of a workpiece placed on the planar surface of the magnetic chuck caused heat to be developed in the workpiece. The generated heat may be sufficient to cause expansion of the workpiece to such an extent that the machining operation being performed on the workpiece can not be held to the desired tolerances. In the past it has been found necessary to stop the machining in such situations so as to permit the workpiece to cool. To promote faster cooling the workpiece is removed from the magnetic chuck and place on or between cool objects, such as pieces of steel which will draw the heat from the workpiece. After the workpiece has cooled, the machining operation is resumed until the operation is completed, or cooling is again required. The machining and cooling cycles are repeated until the machining can be completed to the desired tolerances with the workpiece at or near the temperature at which it will be used. In order to avoid the loss of machining time, due to the need to cool the workpiece, it has been found desirable to provide arrangements for cooling the workpiece during the machining operation.

2. Description of Related Art Including Information Disclosed Under 37 CFR 1.97 and 37 CFR 1.98

To hasten the cooling of a workpiece held by a magnetic chuck, such that the machining can be completed with as little delay as possible, a stream of cool liquid or gas has been directed onto the workpiece or the cutting tool at or near their interface. However, the use of a gas has not been found very effective, since it is a rather inefficient at absorbing and carrying away the excess heat. A liquid is more efficient at carrying away the heat, but presents other disadvantages. One of those disadvantages is the necessity of confining the liquid, which otherwise would be sprayed over the work area by the rapid movement between the workpiece and the cutting tool engaging the workpiece. Another disadvantage is that it is more difficult to observe the cutting operation on the workpiece in the presence of the fluid. As previously set forth, another method of cooling the workpiece has been to release the magnetic force applied to the workpiece, such that it may be moved and placed on or between cool, heat absorbing bodies.

The following patents set forth prior disclosures of magnetic chuck used with machining tools, and cooling arrangements associated with machining tools:

| U.S. Pat. No. | Inventor | Issue Date |
|---|---|---|
| 3,834,088 | Matson | 09/10/74 |
| 3,835,428 | Ito | 09/10/74 |
| 3,978,625 | Klaassen | 09/07/76 |
| 4,164,879 | Martin | 08/21/79 |
| 4,442,576 | Kitamura | 04/17/84 |
| 4,575,702 | Nitta et al | 03/11/86 |
| 4,664,565 | Palm | 05/12/87 |
| 4,811,525 | Kimura et al | 03/14/89 |
| 5,266,914 | Dickson el al | 11/30/93 |
| 5,595,462 | Hensley | 01/21/97 |
| 5,613,812 | Levan et al | 03/25/97 |

The Palm patent reveals the use of a magnetic chuck in combination with an arrangement for supplying coolant fluid to the center of a cutting tool only when engaged with a work piece. The Kimura et al patent shows a grinding head for a surface grinder which incorporates a magnetic chuck and a coolant apparatus for supplying coolant to the position of the grinding process. The Ito, Nitta et al, and Dickson et al patents all set forth the use of a magnetic chuck, but without any reference to cooling of the cutting tool or workpiece. The Matson, Klaassen, Martin, Kitamura, Hensley and Levan et al patents all show the supply of a coolant directly to the interface between the cutting edge of a tool and the workpiece. Thus, the prior art has not shown an arrangement for cooling a workpiece held by a magnetic chuck and being shaped by a cutting tool, other than by the direct application of a cooling medium to the interface of the cutting tool and the workpiece.

It has therefore been found desirable to provide an arrangement for maintaining a workpiece secured by a magnetic chuck at a desired temperature without the need to periodically stop the machining operation to cool the workpiece, or to direct a cooling medium at the interface of the workpiece and the cutting tool.

SUMMARY OF THE INVENTION

Accordingly it is an object of this invention to provide an arrangement for cooling a workpiece secured to a magnetic chuck which does not require the interruption of the machining operation to permit the workpiece to cool. It is a further object of this invention to provide an arrangement to cool a workpiece secured to a magnetic chuck without the need to direct a cooling medium at the interface of the workpiece and the cutting tool. It is a still further object of this invention to provide the desired cooling arrangement in a form which is readily applicable to currently available magnetic chucks without the need for significant modifications of the chucks. By providing internal cooling of the magnetic chuck, or of an adapter placed between the magnetic chuck and the workpiece, it is possible to maintain a steel workpiece at a set temperature throughout an entire machining process, thereby significantly decreasing warpage and or distortion of the workpiece. Thus, more accurate machining can be accomplished with greater consistency, less grinding wheel or other cutting tool breakdown or damage, fewer rejects, and increased productivity.

In accordance with one embodiment of this invention a cooling adapter is provided which is placed on the workpiece holding surface of the magnetic chuck. The adapter is formed from a non-magnetic block of material. A plurality of holes are drilled through the block from top to bottom to accept, in a liquid tight fit, magnetic steel rods. Before the rods are secured in the holes in a liquid tight fit, additional larger holes are drilled in the block parallel to the top and bottom surfaces. Fittings for coolant liquid flow are then proved in the holes to form inlet and outlet passages, whereby coolant may circulate through the larger holes, thereby engaging the sidewall formed by the non-magnetic material, and the portions of the magnetic steel rods which pass through the larger holes. The adapter transmits the magnetic forces of the magnetic chuck to the workpiece through the magnetic steel rods.

Another embodiment of the invention provides passages for coolant flow within the body of the magnetic chuck. Flow passages, generally parallel to its top and bottom surfaces, are provided in the chuck. In various forms of this embodiment, the flow passages may be provided by holes which are formed in the magnetic clutch, generally perpendicular to the planes of the alternating laminations of magnetic and non-magnetic materials. These holes are in one form of the invention provided with fitting which provide coaxial flow of coolant in each of the holes. In another form the holes are connected by other holes which intersect the first holes at each end, so as to provide an inlet passage for coolant flow at an end of one or more of the first holes, and an outlet passage for coolant flow at the end of one or more of other of the first holes. In still another form of this embodiment, channels for flow of coolant may be formed in either the magnetic laminations or the non-magnetic laminations, with flow arrangement being provided at each end of the laminations to form inlets and outlets for the flow of coolant. In all of the various embodiments of this invention, coolant flow through the body of a magnetic chuck or that of a cooling adapter is provided by a coolant flow circuit which includes a coolant reservoir, pump and chiller.

DESCRIPTION OF THE PREFERRED EMBODIMENTS

Figure 1:
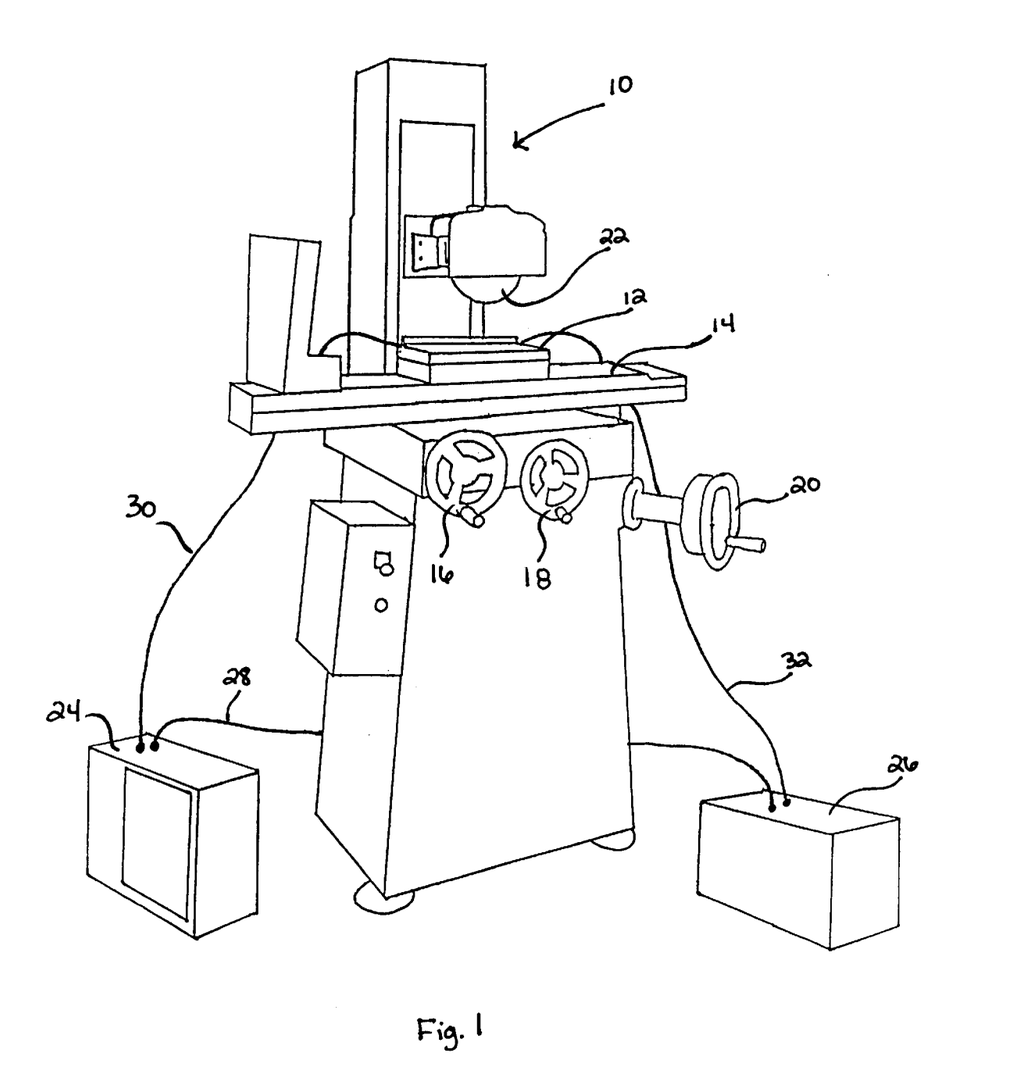
FIG. 1 is a perspective view of a machine tool in the form of a surface grinder provided with a cooled magnetic chuck constructed in accordance with a first embodiment of this invention.

Referring to FIG. 1, a surface grinder 10, is shown provided with a cooled magnetic chuck 12 in accordance with this invention. The cooled magnetic chuck 12 is mounted on the workpiece support plate 14 of the surface grinder 10. The surface grinder 10 is provided with control wheels 16, 18 and 20 for adjusting the position of the support plate 14 with respect to a grinding wheel 22. A workpiece (not shown) which is to be ground by the grinding wheel 22 is secured to the magnetic chuck 12 by magnetic force. The magnetic chuck 12 may be of either the permanent magnet or electromagnet type. In either case, control arrangements are provided for applying and releasing the magnetic force on a workpiece. The type and design of the magnetic chuck is not critical to this invention. Reference may be made to the U.S. patents set forth above for a further understanding of the operation of magnetic chucks.

As shown in FIG. 1, the cooled magnetic chuck 12 is connected in a flow path with a chiller 24 and a reservoir and pump assembly 26. The flow path is from the reservoir and pump assembly 26 through a tube or pipe 28 to the chiller 24. From the chiller 24 the flow is through a tube or pipe 30 to the cooled magnetic chuck 12, and from the cooled magnetic chuck 12 back to the reservoir and pump assembly 26 through a tube or pipe 32. The chiller 24 and the reservoir and pump 26 are provided with suitable controls such that the temperature of the coolant provided to the cooled magnetic chuck 12, and its rate of flow maintain the chuck and more particularly the workpiece held by the chuck at or below a maximum allowable temperature while it is being shaped by the grinding wheel 22.

Figure 2:
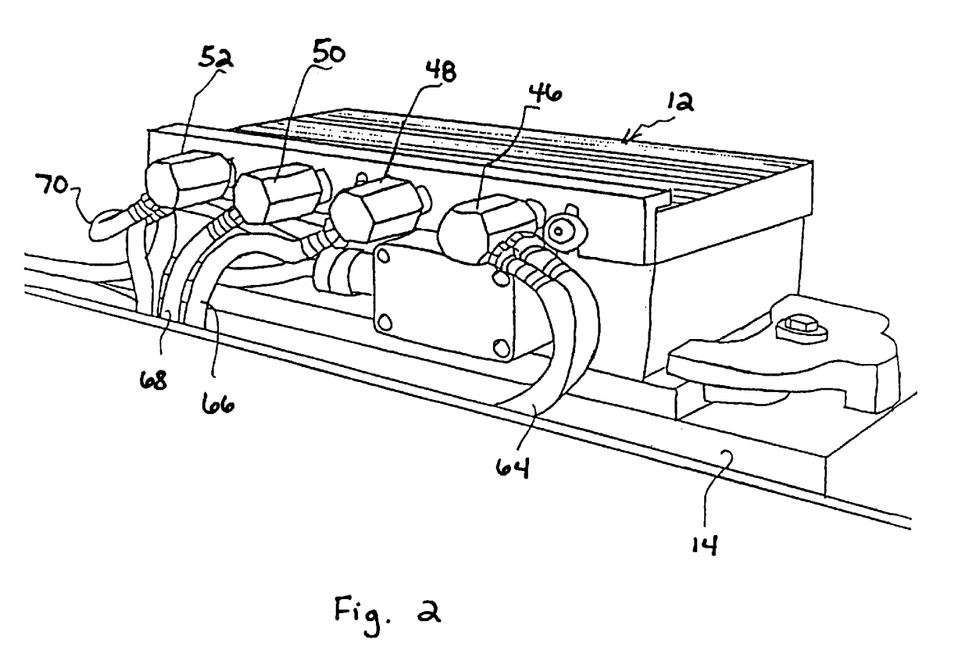
FIG. 2 is a perspective view, enlarged with respect to FIG. 1, of the side of the cooled magnetic chuck of FIG. 1, showing the connections for coolant flow into and out of the cooled magnetic chuck.
Figure 3A:
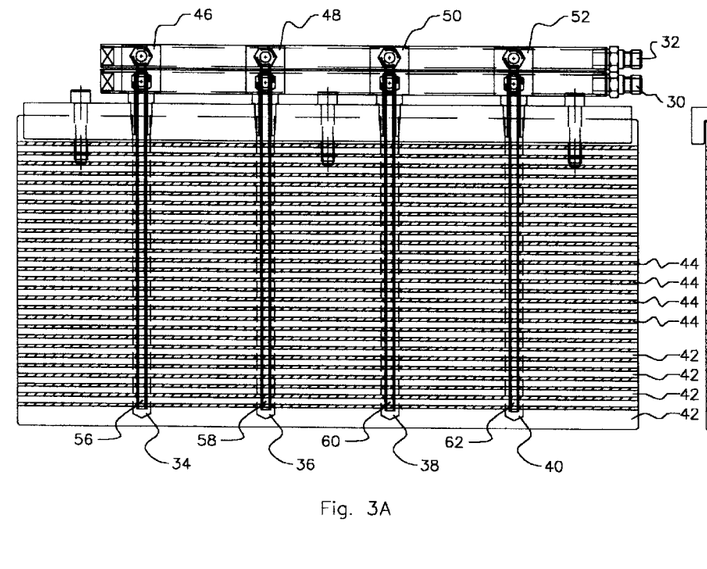
FIG. 3A is a top plan view of the cooled magnetic chuck in accordance with the first embodiment of this invention.
Figure 3B:
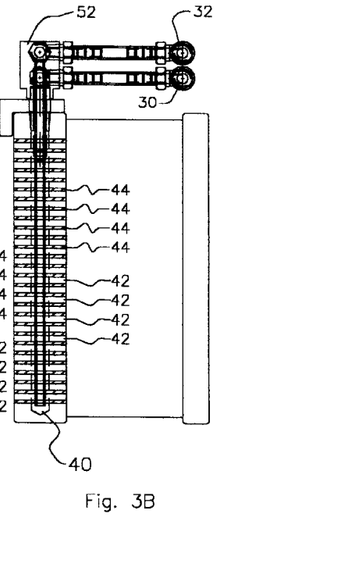
FIG. 3B is an end view of the cooled magnetic chuck shown in FIG. 3A.

Referring to FIGS. 2 and 3A–3C, the connection of the tubes or pipes 30 and 32 to the cooled magnetic chuck 12, and the flow of coolant through passages in the cooled magnetic chuck 12 will be described. Referring more particularly to FIGS. 3A and 3B, bores 34, 36, 38 and 40, closed at one end are formed in the chuck 12. The bores are formed perpendicular to the planes of the alternating laminations of magnetic, i.e. steel members 42 and non-magnetic members 44, and parallel to the top surface of the workpiece support plate 14. A usual material for the non-magnetic materials is stainless steel. Coaxial flow connectors 46, 48, 50, and 52 are secured in the open ends of bores 34, 36, 38, and 40 respectively. The connectors 46, 48, 50, and 52 are provided with tubes 56, 58, 60, and 62 respectively, which extend into the bores 34, 36, 38, and 40 respectively. Coolant enters each of the bores through the outer coaxial flow path of the connector, flows along the sidewalls of the bore, and enters the distal end of the tube to flow back to the connector. Two fittings are provided on each of the connectors, one for flow of coolant to the outer coaxial flow passage, and the other for the flow of coolant through the inner coaxial passage from the tubes extending into the bores.

Figure 3C:
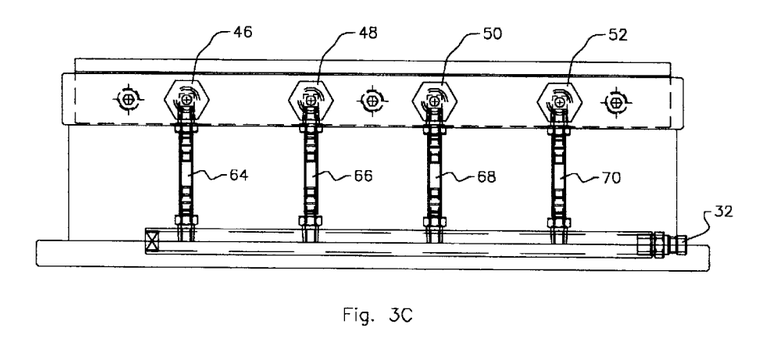
FIG. 3C is a side view of the cooled magnetic chuck shown in FIG. 3A.

The fitting on each of the connectors for the flow of coolant to the outer coaxial flow passage is connected to tube or pipe 30 for receiving flow of coolant from the chiller 24. The fitting on each of the connectors for the flow of coolant from the inner coaxial flow passage and connected tube is connected to tube or pipe 32 for the flow of coolant to the reservoir and pump 26. Referring to FIG. 3C, the connecting tubes 64, 66, 68 and 70 between the inner coaxial passages of connectors 46, 48, 50 and 52, and tubes 56, 58, 60, and 62 and the tube or pipe 32 are shown. Similar connecting tubes are provided between the outer coaxial passages of the connectors 46, 48, 50 and 52 and tube or pipe 30.

By forming the bores 34, 36, 38 and 40 perpendicular to the planes of the magnetic laminations 42, minimal reduction in magnetic force applied to the workpiece is incurred. If the bores were formed parallel to the planes of the magnetic laminations 62, airgaps would be created in one or more of the magnetic laminations 42, resulting is severally reduce magnetic force in the area of the plate where the magnetic laminations are separated into upper and lower portions by the presence of the bore. While four bores are shown in the cooled magnetic chuck, any number could be used. A greater number of bores would provide greater cooling capacity and more uniform cooling over the surface of the cooled magnetic chuck. However, a greater number of bores increases the cost of providing cooling and also further reduces the magnetic force transmitted to the workpiece by the cooled magnetic chuck.

The first embodiment of this invention, as shown in FIGS. 1–3, is a preferred embodiment of this invention for making a cooled magnetic chuck from a previously manufactured non-cooled magnetic chuck, or for manufacturing cooled magnetic chucks by continuing to manufacture presently designed non-cooled magnetic chucks and by supplemental manufacturing steps creating cooled magnetic chucks.

Figure 4A:
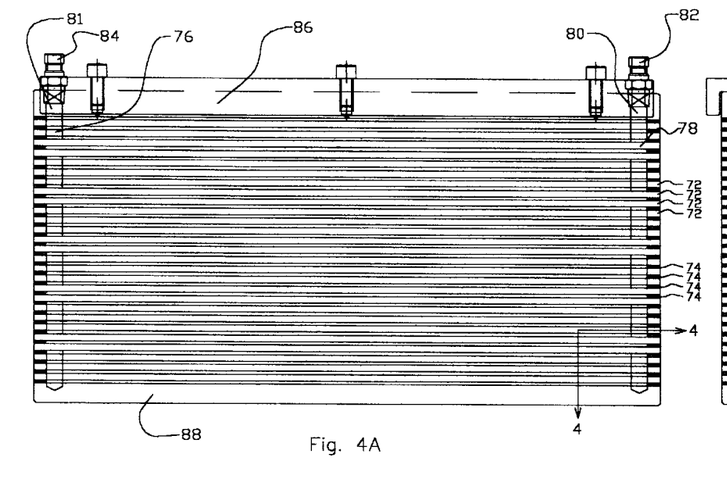
FIG. 4A is a top plan view of a cooled magnetic chuck in accordance with a second embodiment of this invention.
Figure 4B:
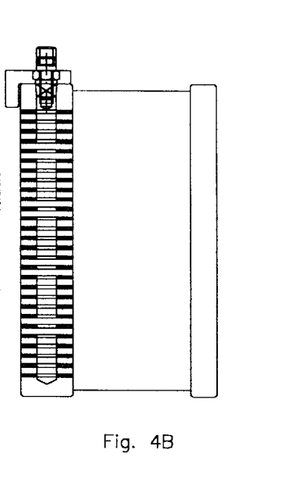
FIG. 4B is an end view of the cooled magnetic chuck shown in FIG. 4A.
Figure 4C:
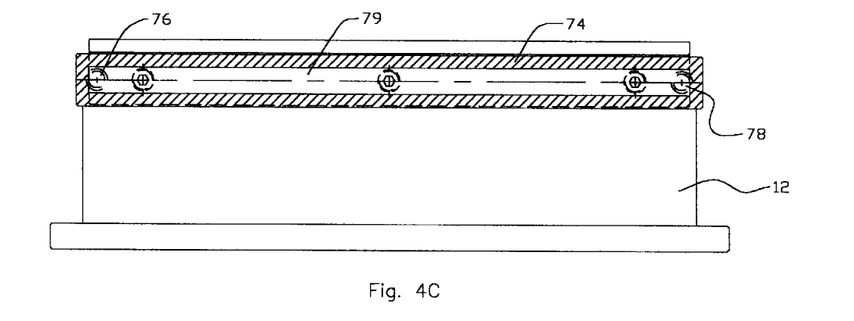
FIG. 4C is a side view of the cooled magnetic chuck shown in FIG. 4A.
Figure 4D:
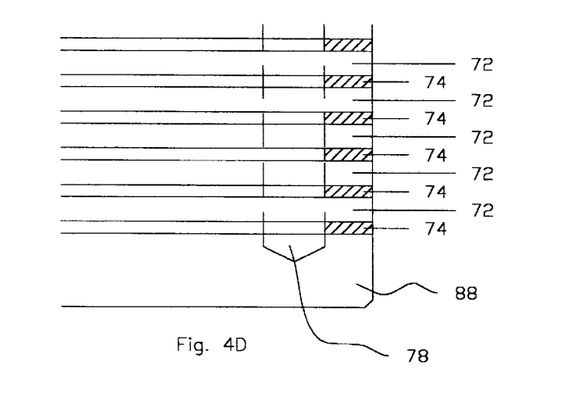
FIG. 4D is an enlarged top view of portion of the cooled magnetic chuck shown by the lines 4—4 in FIG. 4A.

However, both the cooling and magnetic efficiencies of a cooled magnetic chuck may be increased, and the costs of its manufacture reduced with respect to the first embodiment of this invention, by particularly designing the components of the chuck to form cooling passages in the chuck. Referring to FIGS. 4A through 4D a second embodiment of this invention, which is a preferred design for specifically manufacturing a cooled magnetic chuck will be described. As in the first embodiment, the chuck is formed of alternating laminations 72 of magnetic material and 74 of non-magnetic material located in planes which are perpendicular to the planar flat surface of the magnetic chuck which engages the workpiece. The laminations 72 of magnetic material are formed with a pair of holes 76 and 78, one adjacent each end of the lamination. As best seen in FIG. 4C, the non-magnetic laminations 74 are formed with an elongated rectangular slot 79, which extends essential the entire length of the lamination. The sides and ends of the lamination 74 are of substantially the same thickness as shown in FIG. 4C. The pair of holes 76 and 78 formed in the magnetic laminations 72 are located adjacent the ends of the slot 79 when the magnetic laminations 72 and non-magnetic laminations 74 are assembled. By forming apertures 80 and 81 to receive connectors 82 and 84 in end piece 86, inlet and outlet connections for coolant flow may be made to the channels formed by the slots 79 in the non-magnetic laminations 74.

In an alternate method of manufacturing the cooled magnetic chuck shown in FIGS. 4A–4D, alternate magnetic laminations 72 without holes formed in them, and non-magnetic laminations 74 with rectangular slots 79 formed in them may be assembled and secured between the side piece 86 and second side piece 88. Thereafter, holes 76 and 78 are drilled through the side piece 86 and the magnetic laminations 72, with the tip of the drill engaging but not drilling through end piece 88. An advantage of the cooled magnetic chuck design shown in FIGS. 4A–4D over that shown in FIGS. 3A–3 C is that the magnetic performance of the chuck is not compromised by the drilling of holes through the magnetic laminations in the area where cooling is most desired.

Figure 5A:
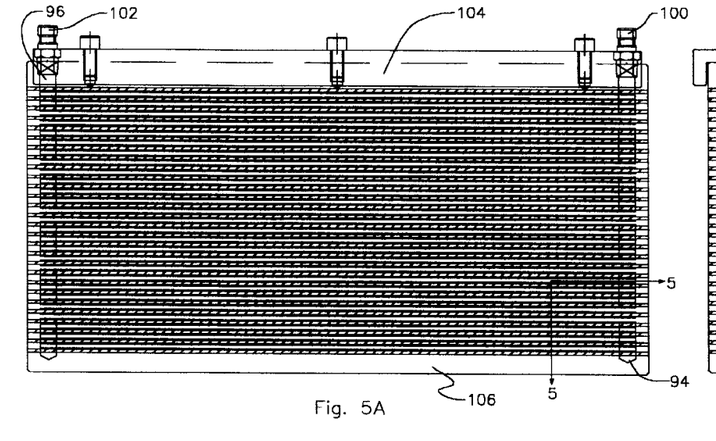
FIG. 5A is a top plan view of a cooled magnetic chuck in accordance with a third embodiment of this invention.
Figure 5B:
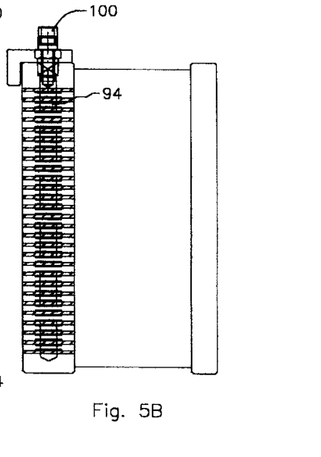
FIG. 5B is an end view of the cooled magnetic chuck shown in FIG. 5A.
Figure 5C:
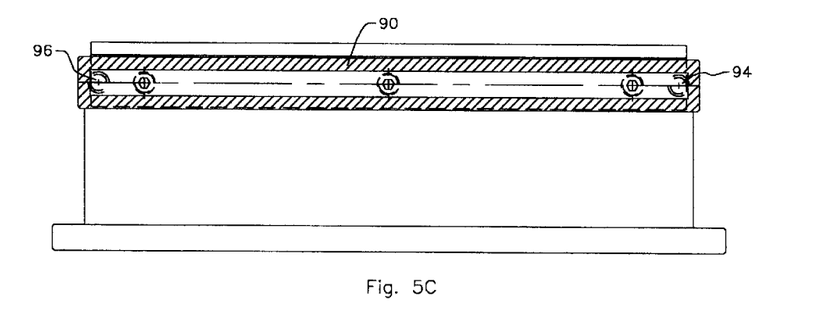
FIG. 5C is a side view of the cooled magnetic chuck shown in FIG. 5A.
Figure 5D:
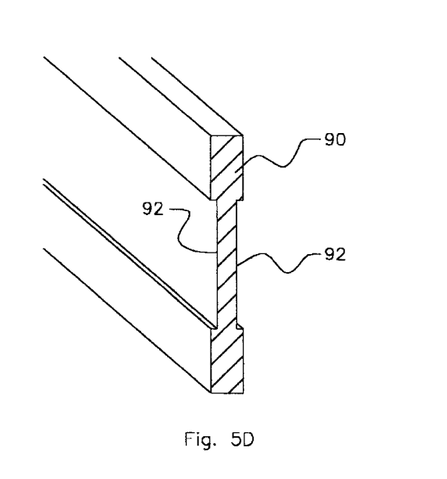
FIG. 5D is an enlarged perspective cross-sectional view of the magnetic steel strips used in the cooled magnetic chuck shown in FIG. 5A.
Figure 5E:
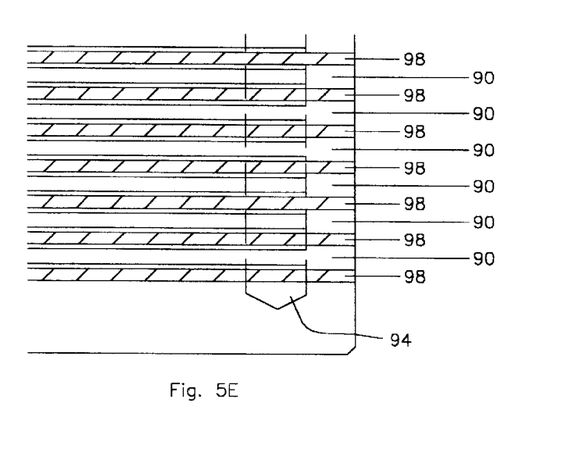
FIG. 5E is an enlarged top view of portion of the cooled magnetic chuck shown by the lines 5—5 in FIG. 5A.

Still another embodiment of a cooled magnetic chuck in accordance with this invention is shown in FIGS. 5A–5E. In this third embodiment, magnetic laminations 90 are specially formed, as best seen in FIG. 5D, to provide channels for the flow of coolant through the magnetic chuck. As shown in FIG. 5D, a rectangular groove 92 is formed on each side of the magnetic laminations 90. As in the second embodiment of this invention shown in FIGS. 4A–4D, aligned holes 94 and 96 are formed at opposite ends of the magnetic laminations 90 and non-magnetic laminations 98, to provide inlet and outlet flow passages through the rectangular grooves 92 formed in the magnetic laminations 90. It should be noted that the grooves 92 in the magnetic laminations end in the holes 94 and 96, such that the adjacent faces of the magnetic laminations 90 and the non-magnetic laminations 98 close the end of the flow channels. Again, connectors 100 and 102 are provided in side piece 104 for making inlet and outlet connections for coolant flow, and side piece 106 closes the opposite ends of holes 94 and 96. As in the previous embodiment shown in FIGS. 4A–4D, the holes 94 and 96 may be formed in the non-magnetic laminations 98, magnetic laminations 90, and side piece 104 before they are assembled, or the hole may be drilled through all of the members after they are assembled.

Figure 6A:
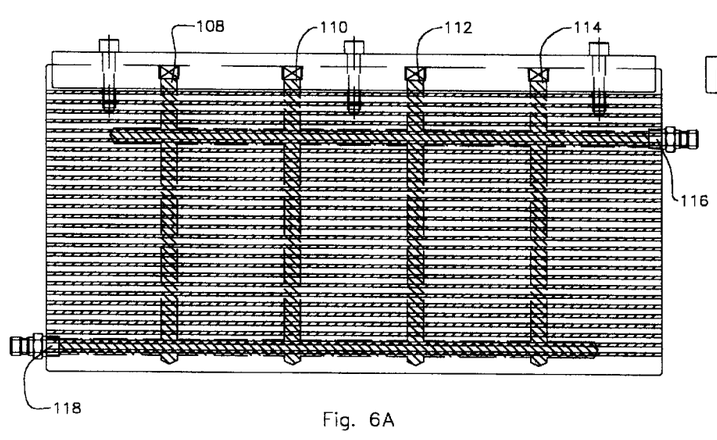
FIG. 6A is a top plan view of a cooled magnetic chuck in accordance with a fourth embodiment of this invention.
Figure 6B:
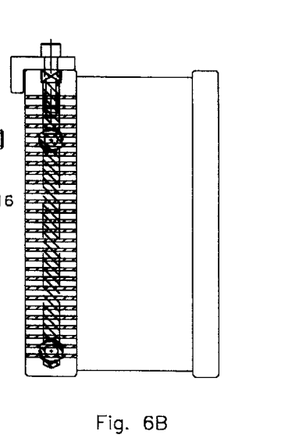
FIG. 6B is an end view of the cooled magnetic chuck shown in FIG. 6A.
Figure 6C:
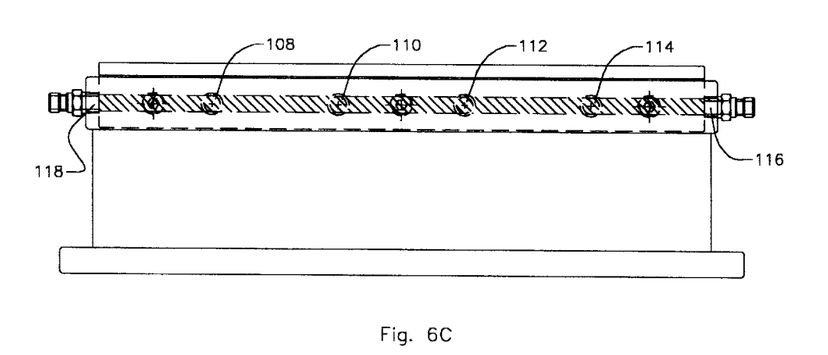
FIG. 6C is a side view of the cooled magnetic chuck shown in FIG. 6A.

A fourth embodiment of this invention is shown in FIGS. 6A–6C. This embodiment is somewhat similar to the first embodiment in that holes 108, 110, 112, and 114 are formed in the alternating magnetic and non-magnetic laminations, at spaced intervals perpendicular to the planes of the laminations. However, in this embodiment rather than providing coaxial flows in opposite directions within a hole, a pair of holes 116 and 118 perpendicular to, and intersecting the holes 108–114 are provided for inlet and outlet flow from the holes 108–114. It should be noted that both end of the holes 108–114 are blocked in this embodiment, as is one end of each of the holes 116 and 118. The embodiment shown in FIGS. 6A–6C,. like that shown in FIGS. 3A–3C is applicable to adapting currently manufactured non-cooled magnetic chucks to cooled magnetic chucks, or for manufacturing newly designed cooled magnetic chucks.

Figure 7A:
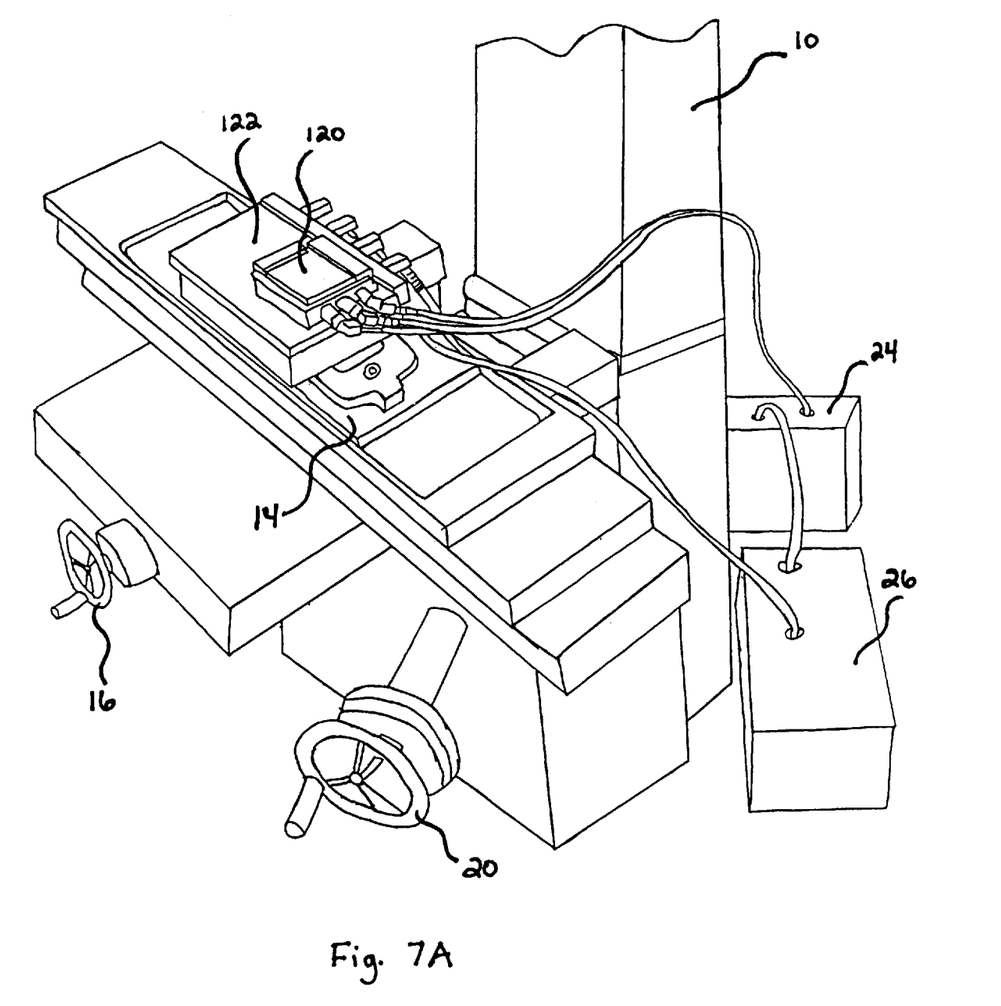
FIG. 7A is a perspective view of a portion of a machine tool in the form of a surface grinder as shown in FIG. 1, with a cooled magnetic chuck constructed in accordance with the first embodiment of this invention, and an additional cooling adapter in accordance with still another embodiment of this invention.
Figure 7B:
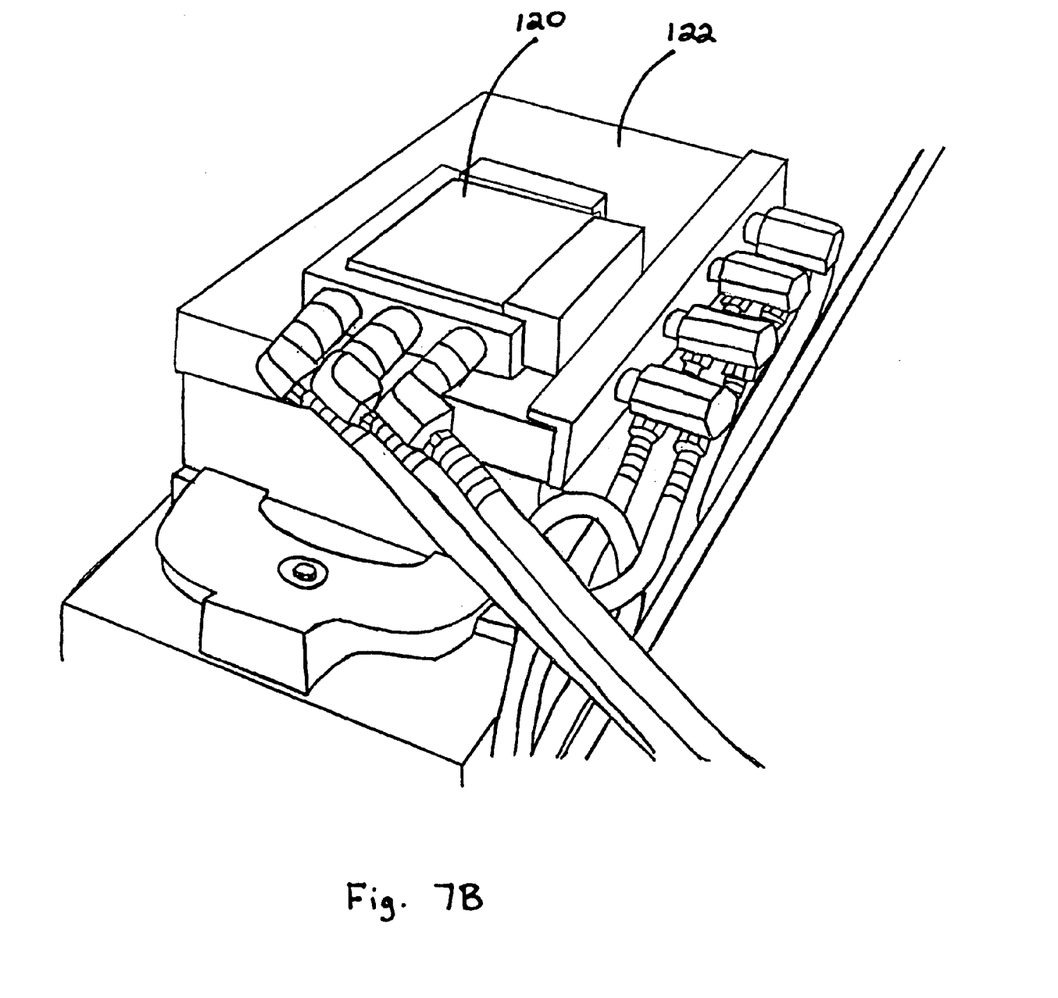
FIG. 7B is a side perspective view of the cooling adapter of this invention as shown in FIG. 7A.
Figure 7C:
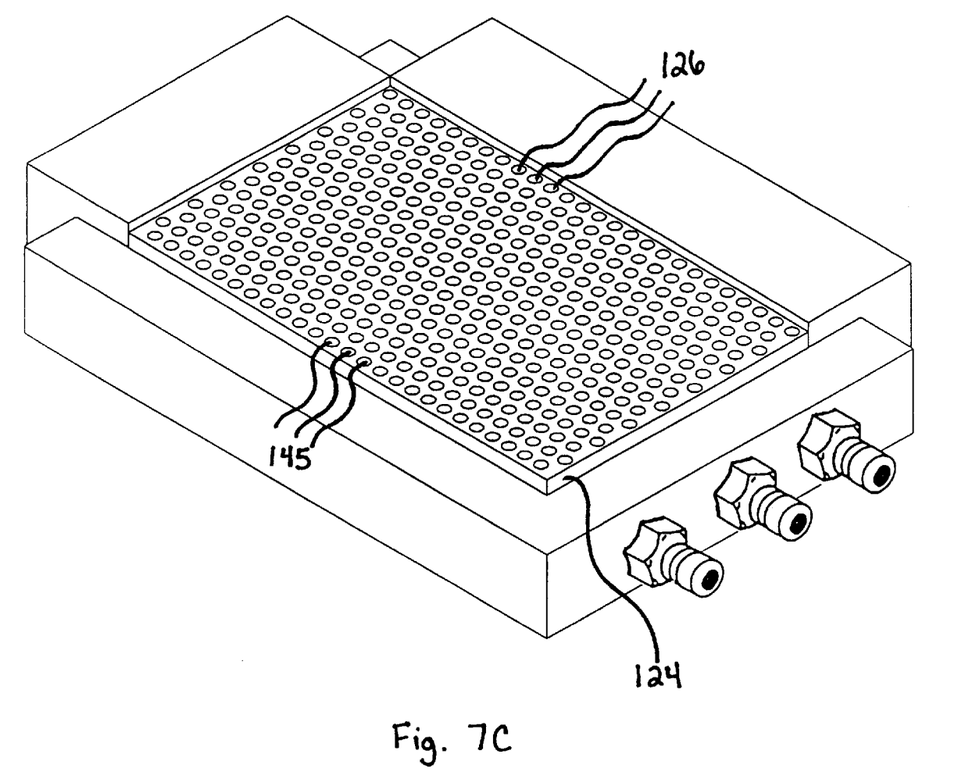
FIG. 7C is a perspective top view of the cooling adapter of this invention as shown in FIG. 7A.
Figure 7D:
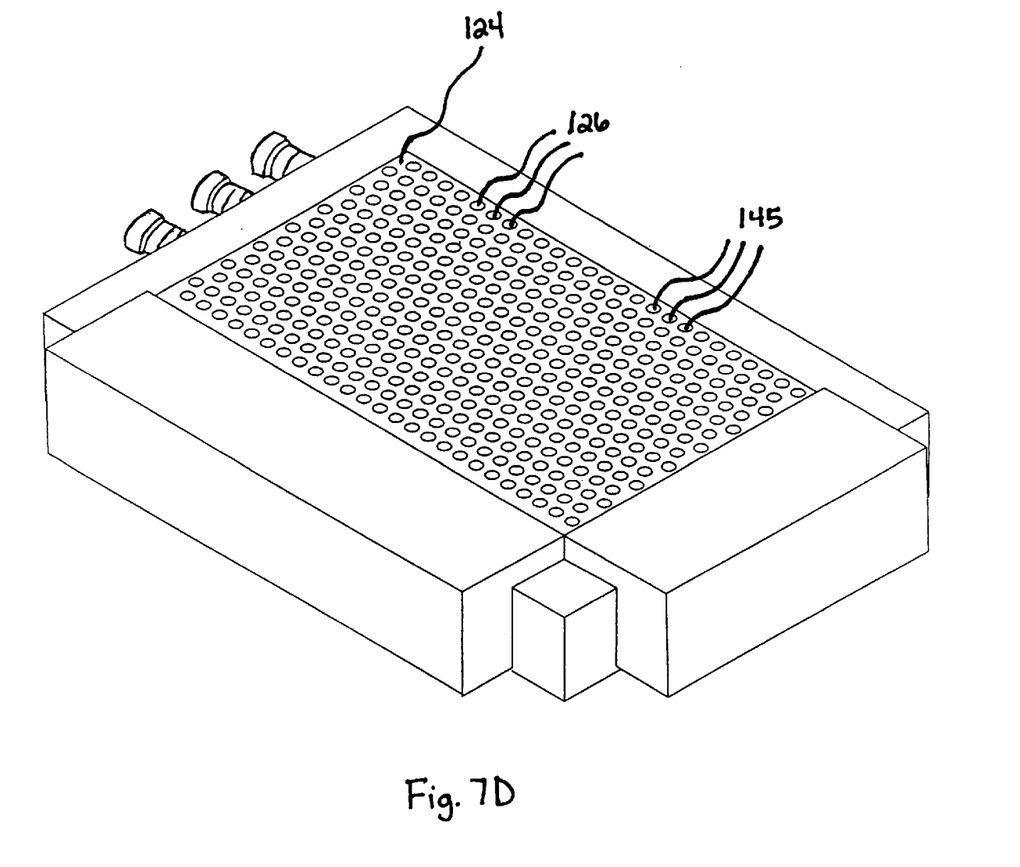
FIG. 7D is a side perspective view of the cooling adapter of this invention as shown in FIG. 7A.
Figure 7E:
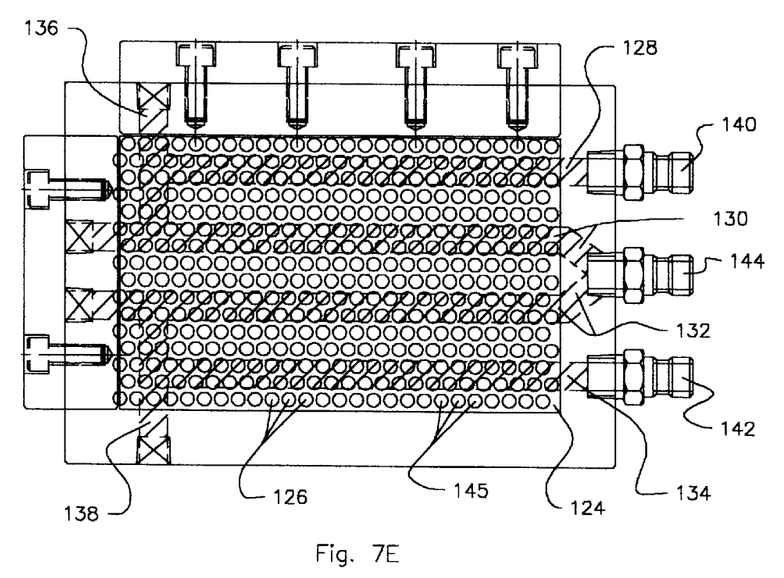
FIG. 7E is a top plan view of the cooling adapter of this invention as shown in FIG. 7A.
Figure 7F:
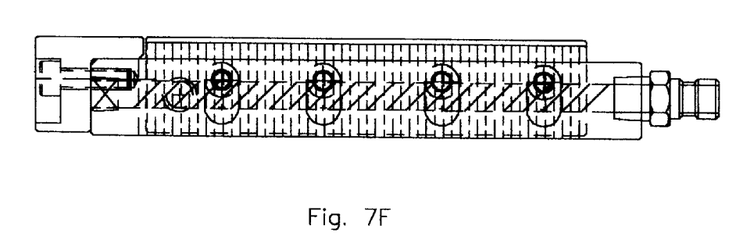
FIG. 7F is a side view of the cooling adapter of this invention as shown in FIG. 7A.
Figure 7G:
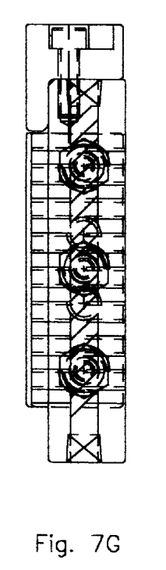
FIG. 7G is an end view of the cooling adapter of this invention as shown in FIG. 7A.

Still another embodiment of this invention is shown in FIGS. 7A–7G. In this embodiment a magnetic chuck is provided with cooling in accordance with this invention by a cooling adapter 120, one side of which is placed on the magnetic holding surface of the magnetic chuck, so as to transmit the magnetic force of the chuck to a workpiece mounted on the opposite side of the cooling adapter. This embodiment of the invention would be used with non-cooled magnetic chucks already in use in a metal shaping facility, such as is shown in FIG. 7A. While in most applications, if a cooled magnetic chuck is provided in accordance with this invention, a separate cooling adapter 120 in accordance with this embodiment of the invention would not be required, FIG. 7B shows a cooling adapter 120 mounted on a cooled magnetic chuck 122 of the type shown in FIGS. 3A–3C. However, in certain applications where increased cooling capacity is desirable, the use of dual cooling systems as shown in FIGS. 7A and 7B might be found advantageous. In such applications, the coolant circulating in the cooled magnetic chuck 122 could be maintained at a cooler temperature than the coolant circulating in the cooling adapter 120.

Referring particularly to FIGS. 7C–7G, the construction of the cooling adapter 120 will be described. A block 124 of non-magnetic material such as aluminum or stainless steel, is formed with a plurality of holes 126 which extend between the surface of the block 124 engaging the holding surface of the magnetic chuck, and the opposite face of the block on which a workpiece is mounted. Four additional holes 128, 130, 132, and 134 are formed in the block perpendicular to the holes 126 and parallel to the surfaces of the block and to each other. As in previous embodiments, these holes are provided for inlet and outlet flow paths for the circulation of coolant. Finally, holes 136 and 138 are provided to connect holes 128 and 130 and 132 and 134 respectively to each other. A connector 140 is provided in hole 128, a connector 142 is provided in hole 134, and a connector 144 is provide in a hole which is connected to holes 130 and 132. With coolant being supplied to connector 144, it will flow through two paths to cool the cooling structure 120. One of the paths is from connector 144 to hole 130, hole 136, and hole 128 to connector 140. The other path is from connector 144 to hole 132, hole 138, and hole 134 to connector 142. After the holes 126, 128, 130, 132, 134, 136, and 138 are formed in the block, such as by drilling, magnetic, that is steel rods 145 are placed in each of the holes 126 in a tight leakproof fit. In this embodiment, the cooling fluid not only engages and cools the walls of the hole 128–138 formed in the non-magnetic material, but it also engages the magnetic rods 145 which pass through those holes, so as to cool the rods.

Figure 8A:
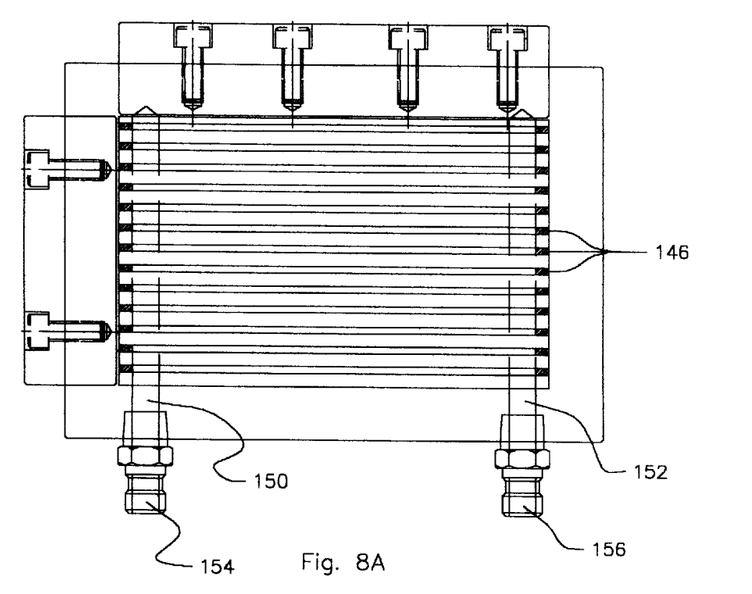
FIG. 8A is a top plan view of a second embodiment of a cooling adapter for use with a magnetic chuck in accordance with this invention, similar to that shown in FIG. 7.
Figure 8B:
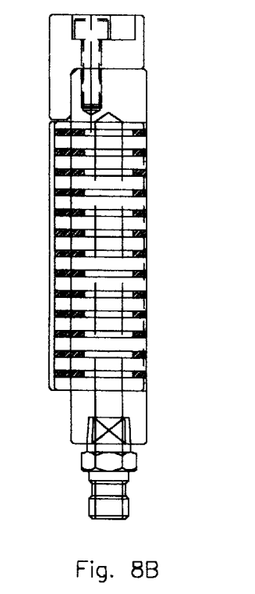
FIG. 8B is an end view of the cooling adapter shown in FIG. 8A.
Figure 8C:
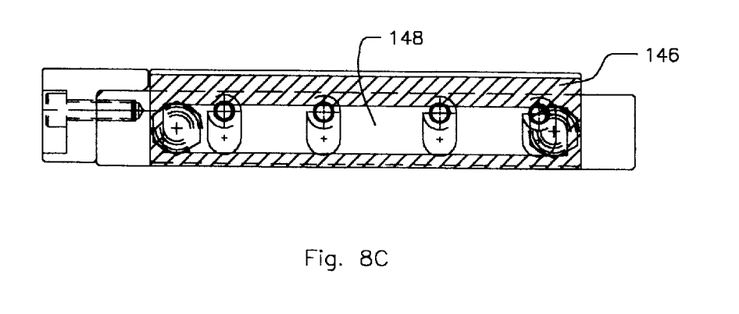
FIG. 8C is a side view of the cooling adapter shown in FIG. 8A.

Referring to FIGS. 8A–8C, another embodiment of a cooling plate or adapter for use with a magnetic chuck is disclosed. In this embodiment, the non-magnetic laminations 146 are provided with rectangular slots 148, each of which provides a flow path for coolant which enters one end of the slot and flows out of the other, as was described with respect to the second embodiment of this invention as show in FIGS. 4A–4D. As was described with respect to the second embodiment, each of the magnetic laminations has a hole at each end, which holes are aligned to form bores 150 and 152 which are provided with connectors 154 and 156 to form an inlet and an outlet for the flow of coolant through the cooling adapter.

While the cooled magnetic chuck and cooling adapter from use with a magnetic chuck in accordance with this invention are shown in FIGS. 1 and 7A is used with a surface grinder, they are equally applicable for use with other machine tools provided with magnetic chucks. Further, while several embodiments of the invention in the forms of cooled magnetic chucks and magnetic cooling adapters have been shown, it should be apparent to those skilled in the art that what have been described are considered at present to be preferred embodiments of the invention, and are suggestive of many other ways of implementing the applicants invention. For instance, many other arrangements for forming paths for the flow of coolant through a magnetic chuck or a cooling adapter are contemplated by this invention. As long as the desired magnetic properties of the magnetic chuck or magnetic cooling adapter are essentially preserved, in accordance with this invention, the paths for the flow of coolant may be formed by numerous different structural arrangements and in numerous different flow patterns. In accordance with the Patent Statute, changes may be made in the cooled magnet chucks and cooled magnetic adapters of this invention without actually departing from the true spirit and scope of this invention. The appended claims are intended to cover all such changes and modification which fall in the true spirit and scope of this invention.

What is claimed is:

1. An internally cooled magnetic adapter for use between a magnetic chuck and a steel workpiece, the adapter transmitting the magnetic force of the magnetic chuck to the workpiece, the cooled magnetic adapter being formed of a block of non-magnetic material having a first flat planar surface which engages the magnetic chuck, and an opposite flat planar surface upon which a steel workpiece is placed to be held while work is performed on it, said block of non-magnetic material being provided with a plurality of holes extending between said first and opposite flat planar surfaces, a magnetic rod being secured in each of said holes to transmit magnetic force from the magnetic chuck engaging said first planar surface to a workpiece placed on the opposite planar surface, an internal flow path formed through the block of non-magnetic material for receiving a flow of coolant, thereby cooling the adapter and the steel workpiece held thereon.

2. The internally cooled magnetic adapter of claim 1, wherein said internal flow path is formed by at least one bore in said non-magnetic block, the axis of said bore being generally parallel to said first and opposite flat planar surfaces.

3. An internally cooled workpiece holder formed of alternating laminations of magnetic and non-magnetic material, at least one edge of which laminations forms a flat surface perpendicular to the planes of the laminations, upon which a steel workpiece is placed to be held while work is performed on it, an internal flow path formed through the laminations of magnetic and non-magnetic material for receiving a flow of coolant, said internal flow path provided in part by channels formed in the non-magnetic laminations, thereby cooling the magnetic workpiece holder and the steel workpiece held thereon.

4. The internally cooled workpiece holder of claim 3, wherein bores are provided passing through the magnetic and non-magnetic laminations adjacent each end of said channels, wherein one of said bores provides an inlet passage and the other of said bores provides an outlet passage for the flow of coolant through said channels.

5. The internally cooled workpiece holder of claim 3, wherein said channels are formed by at least one slot in the non-magnetic laminations.

6. An internally cooled workpiece holder formed of alternating laminations of magnetic and non-magnetic material, at least one edge of which laminations forms a flat surface perpendicular to the planes of the laminations, upon which a steel workpiece is placed to be held while work is performed on it, an internal flow path formed through the laminations of magnetic and non-magnetic material for receiving a flow of coolant, wherein said internal flow path is provided in part by channels formed in the magnetic laminations, thereby cooling the magnetic workpiece holder and the steel workpiece held thereon.

7. The internally cooled workpiece holder of claim 6, wherein bores are provided passing through the magnetic and non-magnetic laminations adjacent each end of said channels, wherein one of said bores provides an inlet passage and the other of said bores provides an outlet passage for the flow of coolant through said channels.

8. The internally cooled workpiece holder of claim 6, wherein said channels are provided by at least one groove formed in at least one side of the magnetic laminations.

9. The internally cooled workpiece holder of claim 6, wherein said channels are provided by at least one groove formed in each of the sides of the magnetic laminations.

10. An internally cooled workpiece holder formed of alternating laminations of magnetic and non-magnetic material, at least one edge of which laminations forms a flat surface perpendicular to the planes of the laminations, upon which a steel workpiece is placed to be held while work is performed on it, an internal flow path formed through the laminations of magnetic and non-magnetic material for receiving a flow of coolant, said internal flow path formed by at least one bore which pass through the laminations of magnetic and non-magnetic materials, thereby cooling the magnetic workpiece holder and the steel workpiece held thereon.

11. The internally cooled workpiece holder of claim 10, wherein said at least one bore is generally perpendicular to the planes of the laminations of magnetic and non-magnetic materials.

12. An internally cooled workpiece holder formed of alternating laminations of magnetic and non-magnetic material, at least one edge of which laminations forms a flat surface perpendicular to the planes of the laminations, upon which a steel workpiece is placed to be held while work is performed on it, an internal flow path formed through the laminations of magnetic and non-magnetic material for receiving a flow of coolant, said internal flow path is formed by a plurality of bores which pass through the laminations of magnetic and non-magnetic materials and are generally perpendicular to the planes of the laminations of magnetic and non-magnetic material, thereby cooling the magnetic workpiece holder and the steel workpiece held thereon.

13. The internally cooled workpiece holder of claim 12, wherein each of the bores has an open end and a closed end, and a fitting which provides coaxial flow of coolant into and out of the bore is provided in the open end of each bore.

14. An internally cooled workplace holder formed of alternating laminations of magnetic and non-magnetic material, the alternating laminations of magnetic and non-magnetic material are components of a magnetic chuck, at least one edge of which laminations forms a flat surface perpendicular to the planes of the laminations, upon which a steel workpiece is placed to be held while work is performed on it, an internal flow path formed through the laminations of magnetic and non-magnetic material for receiving a flow of coolant, thereby cooling the magnetic workpiece holder and the steel workpiece held thereon.

15. An internally cooled workpiece holder formed of alternating laminations of magnetic and non-magnetic material, the alternating laminations of magnetic and non-magnetic material are components of an adapter design to be used between a magnetic chuck and a steel workpiece, the adapter transmitting the magnetic force of the magnetic chuck to a workpiece, at least one edge of which laminations forms a flat surface perpendicular to the planes of the laminations, upon which a steel workpiece is placed to be held while work is performed on it, an internal flow path formed through the laminations of magnetic and non-magnetic material for receiving a flow of coolant, thereby cooling the magnetic workplace holder and the steel workpiece held thereon.

16. An internally cooled magnetic chuck, a portion of which is formed of alternating laminations of magnetic and non-magnetic material, at least one edge of which laminations forms a flat surface perpendicular to the planes of the laminations, upon which a steel workpiece is placed to be held while work is performed on it, an internal flow path formed through the laminations of magnetic and non-magnetic material for receiving a flow of coolant, said internal flow path is formed by a plurality of bores which pass through the laminations of magnetic and non-magnetic materials and are generally perpendicular to the planes of the laminations of magnetic and non-magnetic material, thereby cooling the magnetic chuck and the steel workpiece held thereon.

17. An internally cooled magnetic chuck, a portion of which is formed of alternating laminations of magnetic and non-magnetic material, at least one edge of which laminations forms a flat surface perpendicular to the planes of the laminations, upon which a steel workpiece is placed to be held while work is performed on it, an internal flow path formed through the laminations of magnetic and non-magnetic material for receiving a flow of coolant, said internal flow path provided in part by channels formed in the non-magnetic laminations, thereby cooling the magnetic chuck and the steel workpiece held thereon.

18. The internally cooled magnetic chuck of claim 17, wherein bores are provided passing through the magnetic and non-magnetic laminations adjacent each end of said channels, wherein one of said bores provides an inlet passage and the other of said bores provides an outlet passage for the flow of coolant through said channels.

19. The internally cooled magnetic chuck of claim 17, wherein said channels are formed by at least one slot in the non-magnetic laminations.

20. An internally cooled magnetic chuck, a portion of which is formed of alternating laminations of magnetic and non-magnetic material, at least one edge of which laminations forms a flat surface perpendicular to the planes of the laminations, upon which a steel workpiece is placed to be held while work is performed on it, an internal flow path formed through the laminations of magnetic and non-magnetic material for receiving a flow of coolant, said internal flow path provided in part by channels formed in the magnetic laminations, thereby cooling the magnetic chuck and the steel workpiece held thereon.

21. The internally cooled magnetic chuck of claim 20, wherein bores are provided passing through the magnetic and non-magnetic laminations adjacent each end of said channels, wherein one of said bores provides an inlet passage and the other of said bores provides an outlet passage for the flow of coolant through said channels.

22. The internally cooled magnetic chuck of claim 20, wherein said channels are provided by at least one groove formed in at least one side of the magnetic laminations.

23. The internally cooled magnetic chuck of claim 20, wherein said channels are provided by at least one groove formed in each of the sides of the magnetic laminations.

24. An internally cooled magnetic chuck, a portion of which is formed of alternating laminations of magnetic and non-magnetic material, at least one edge of which laminations forms a flat surface perpendicular to the planes of the laminations, upon which a steel workpiece is placed to be held while work is performed on it, an internal flow path formed through the laminations of magnetic and non-magnetic material for receiving a flow of coolant, said internal flow path is formed by at least one bore which pass through the laminations of magnetic and non-magnetic materials, thereby cooling the magnetic chuck and the steel workpiece held thereon.

25. The internally cooled magnetic chuck of claim 24, wherein said at least one bore is generally perpendicular to the planes of the laminations of magnetic and non-magnetic materials.

26. The internally cooled magnetic adapter of claim 1, wherein said internal flow path is formed by a plurality of bores in said non-magnetic block, the axis of said bores being generally parallel to said first and opposite flat planar surfaces.

27. The internally cooled magnetic chuck of claim 16, wherein each of the bores has an open end and a closed end, and a fitting is provided in the open end of each bore which provides coaxial flow of coolant into and out of the bore.

28. In a magnetic adapter, for use between a magnetic chuck and a steel workpiece, which magnetic adapter includes magnetic material forming a first flat surface for engaging the magnetic clutch, and a second flat surface upon which a steel workpiece is placed to be held by the magnetic force of the chuck while work is being performed on it, an internal flow path formed in the magnetic adapter to receive a flow of coolant to cool the magnetic material and the steel workpiece placed thereon.

29. An internally cooled magnetic adapter for use between a magnetic chuck and a steel workpiece, the adapter transmitting the magnetic force of the magnetic chuck to the workpiece, a portion of the cooled adapter being formed of alternating laminations of magnetic and non-magnetic material, at least one edge of which laminations forms a flat surface perpendicular to the planes of the laminations, upon which a steel workpiece is placed to be held while work is performed on it, an internal flow path formed through the laminations of magnetic and non-magnetic material for receiving a flow of coolant, thereby cooling the adapter and the steel workpiece held thereon.

30. The internally cooled magnetic adapter of claim 29, wherein said internal flow path is provided in part by channels formed in the non-magnetic laminations.

31. The internally cooled magnetic adapter of claim 30, wherein bores are provided passing through the magnetic and non-magnetic laminations adjacent each end of said channels, wherein one of said bores provides an inlet passage and the other of said bores provides an outlet passage for the flow of coolant through said channels.

32. The internally cooled magnetic adapter of claim 30, wherein said channels are formed by at least one slot in the non-magnetic laminations.

33. The internally cooled magnetic adapter of claim 29, wherein said internal flow path is provided in part by channels formed in the magnetic laminations.

34. The internally cooled magnetic adapter of claim 33, wherein bores are provided passing through the magnetic and non-magnetic laminations adjacent each end of said channels, wherein one of said bores provides an inlet passage and the other of said bores provides an outlet passage for the flow of coolant through said channels.

35. The internally cooled magnetic adapter of claim 33, wherein said channels are provided by at least one groove formed in at least one side of the magnetic laminations.

36. The internally cooled magnetic adapter of claim 33, wherein said channels are provided by at least one groove formed in each of the sides of the magnetic laminations.

37. The internally cooled magnetic adapter of claim 29, wherein said internal flow path is formed by at least one bore which pass through the laminations of magnetic and non-magnetic materials.

38. The internally cooled magnetic adapter of claim 37, wherein said at least one bore is generally perpendicular to the planes of the laminations of magnetic and non-magnetic materials.

39. The internally cooled magnetic adapter of claim 29, wherein said internal flow path is formed by a plurality of bores which pass through the laminations of magnetic and non-magnetic materials and are generally perpendicular to the planes of the laminations of magnetic and non-magnetic material.

40. The internally cooled magnetic adapter of claim 27, wherein each of the bores has an open end and a closed end, and a fitting is provided in the open end of each bore which provides coaxial flow of coolant into and out of the bore.

41. The internally cooled magnetic adapter of claim 26, wherein said magnetic rods extend through said plurality of bores.

42. The internally cooled magnetic adapter of claim 2, wherein said magnetic rods extend through said at least one bore.

* * * * *